JAMES E. EMERSON.
Saws for Sawing Stone.

No. 127,585. Patented June 4, 1872.

Witnesses:
T. C. Brecht.
Charles Cohurn

Inventor:
James E. Emerson
By N. Crawford
Atty.

ND. 127,585

UNITED STATES PATENT OFFICE.

JAMES E. EMERSON, OF TRENTON, NEW JERSEY.

IMPROVEMENT IN SAWS FOR SAWING STONE.

Specification forming part of Letters Patent No. 127,585, dated June 4, 1872.

I, JAMES E. EMERSON, of Trenton, in the county of Mercer, in the State of New Jersey, have made certain Improvements in Circular and other Saws for Sawing Stone, of which the following is a specification:

The object of this invention is to produce a saw for sawing or dressing stone that will be cheap and durable; a saw in which the diamond or carbon points or cutters are dispensed with; and it consists in the construction and arrangement of the cutter or point that cuts away the stone, and the holder which holds the cutter in the saw-blade, as will be hereinafter more fully described.

Figure 1:
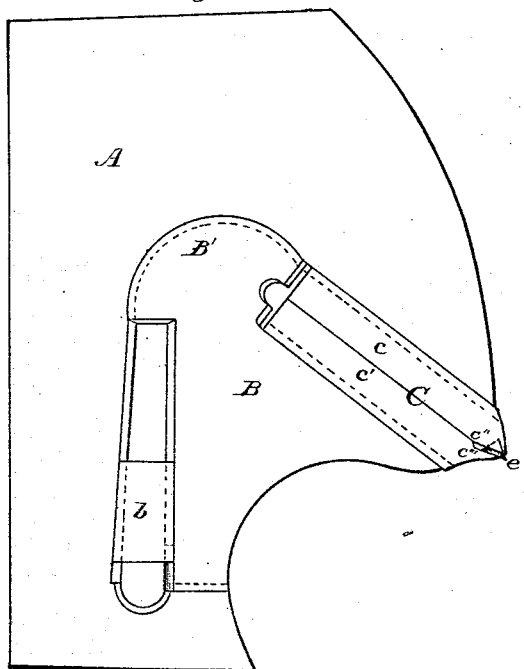
Figure 3:
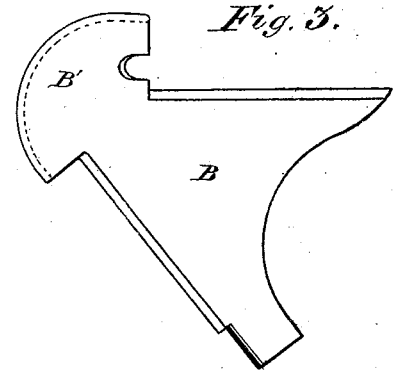
Figure 4:
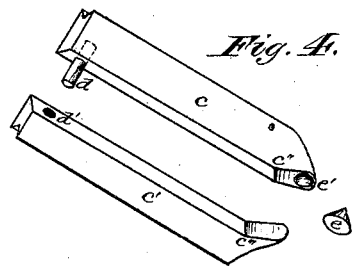
Figure 2:
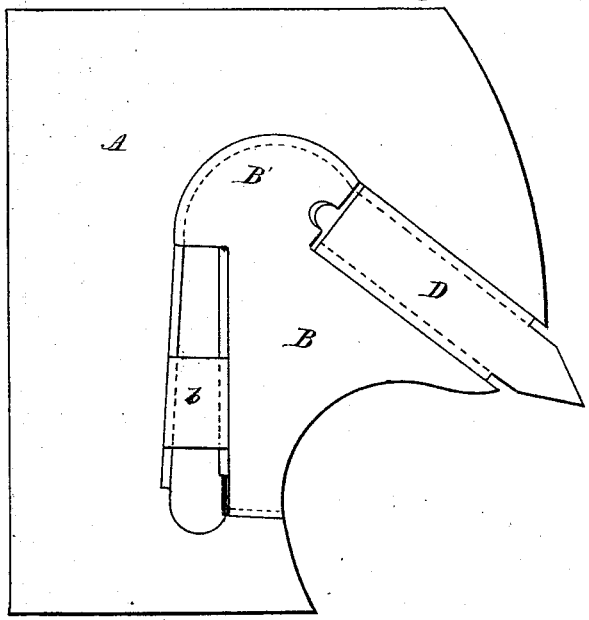
Figure 5:
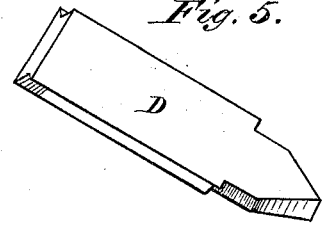

In the drawing, Figure 1 is a side view of a section of a saw-plate having the holder and cutter in place and clamped therein. Fig. 2 is a side view of a section of a saw-plate having a chisel-cutter clamped in the saw-blade. Fig. 3 is a side view of the clamp that holds the cutter in place in the saw-blade. Fig. 4 is a view of the cutter-holder detached from the saw-plate and the cutter removed from the holder; and Fig. 5 is a side view of the chisel cutter detached from the saw-plate.

Heretofore, where saws were used for sawing stone, the cutters have generally been diamonds or carbons, costing many dollars each, while, by my inventions, cutters made from steel wire, in the proper shape, and tempered as I temper them, costing but a few cents each, and answering all the purposes of a diamond cutter, reduce the price of such saws to only a nominal sum; hence, the cost of sawing stone will be made materially less, and the public served at a less cost.

A represents a section of a saw-blade cut out in the form to receive the clamp-piece, tooth, or cutter-holder. B is a clamp-piece of a similar form, and operating to hold the cutter or cutter-holder by the same means as what is described and seen in a former patent granted to me, and dated April 25, 1871. C is a cutter-holder composed of two parts, c and c'. Each of these parts is grooved on its outside edge to fit onto ribs on the clamp-piece and saw-blade, have plain straight edges that come together, when in place, to points c'' and c''', where they angle, as is seen in Figs. 1 and 4; and at c''', on part c', there is a back-set or shoulder, so that when the body parts fit closely together there will be an opening or slot between the angular parts to their outer ends, to receive in part a cutter. e is a cutter made from steel wire of the proper size, with a plain face on its cutting-side, and tapered back to a point, or nearly to a point, forming a cone in shape. In part c of the cutter-holder C, and close to its outer end, is a deep cavity, e', to receive and fit the apex or point end of the cutter e, and in which the cutter is placed when in use, the circular cutting-edge projecting a sufficient distance beyond the extreme end of the holder to admit of its surely taking hold of the stone for cutting it away; or the construction of this circular-edged cutter e may be varied by making the cutter flat on both its cutting-face and on its back side, and making a hole through it centrally, and having a pin projecting from part c about as far as the cutter is thick, upon which the cutter is placed and then clamped in place. This admits of the turning around of the cutter to present different portions of its cutting-edge to the work. The diameter of this cutter determines the width of the kerf or channel cut by the saw, which must be, of course, greater than the saw-plate or holder is thick, in order to clear properly, and not have the saw bind in the kerf. As less than one-half of the periphery of this cutter e will be in action when clamped in the holder of the saw, it will be readily seen that it can, when the sharp cutting-edge of the first one-half, as first used, is blunt or dull, be turned to present the next one-half, and so to the position when the cutter will be essentially used up, and can be replaced by another. Near to the inner ends of parts c and c' are made two holes, d', in which goes a dowel-pin, d, which prevents any lateral movement of the parts c and c' with relation to each other at the inner ends, while the cutter e, being partly embedded in part c, and part c' clamped hard onto its face, holds the cutter in place, as well as prevents any lateral movement of the outer ends of the parts c and c' of holder C. The cutter-holder C is clamped between the clamp-piece B and the wall of the recess in the saw-blade, and held in such position by the wedge b as seen in Figs. 1 and 2, and can be removed from or adjusted to any projection from the saw-blade desired by simply driving wedge b back, when the clamp will fall or turn down a little and relieve the holder, so that it can be removed from or adjusted in the saw-blade; or the cutter can, by the same means, be relieved from being held in rigid position, and can be adjusted to have a new cutting-edge presented to the stone, or be removed from the holder and a new one inserted, when the wedge $b$ is again forced forward and the cutter-holder clamped firmly in place. D is a cutter with a chisel-shaped cutting-edge, and is fully described as to shape and function in my patent above described, and it can be interchanged with the holder C, as the cutter D occupies the same space in width as the cutter-holder; or, in a saw, the cutter D, and holder C with its cutter $e$, can alternate; or a saw may be formed of any arrangement of these two kinds of cutters; or all the cutters may be such as is shown as held by the cutter-holders.

The form of the cutter and the construction of the holder that holds the cutter are well adapted, and can be used to great advantage in stone-planers, where the stone is secured upon a reciprocating carriage operating in a similar manner to an iron planer, without any change in the construction of either the cutter or holder.

Having thus described my invention, what I claim, and desire to secure by Letters Patent, is—

1. The cutter-holder C, composed of parts $c$ and $c'$, having angular jaws $c''$ and $c'''$, dowel-pin $d$, hole $d'$, and deep cavity $e'$, constructed in the manner and for the purpose substantially as described.

2. The combination of the cutter-holder C, constructed as described, and having the angular jaws $c''$ and $c'''$, and cavity $e'$ with the conical cutter $e$, in the manner substantially as shown.

3. The combination of the cutter-holder C, cutter $e$, and clamp-piece B with the saw-plate A, all constructed to operate in the manner substantially as described.

JAMES E. EMERSON.

Witnesses:
C. W. SAYLER,
S. F. SMITH.